(12) United States Patent
El Mabsout et al.

(10) Patent No.: US 8,262,028 B2
(45) Date of Patent: Sep. 11, 2012

(54) SPACECRAFT AND METHOD FOR OPERATING THE SPACECRAFT

(75) Inventors: Badaoui El Mabsout, Kremlin-Bicetre (FR); Alain Bioget, Saint Ouen l'Aumone (FR); Michel Dudeck, Ivry-sur-Seine (FR)

(73) Assignees: Universite Pierre et Marie Curie (Paris 6), Paris (FR); Palais de la Decouverte, Paris (FR); Centre National de la Recherche Scientifique, Paris (FR)

(*) Notice: Subject to any disclaimer, the term of this patent is extended or adjusted under 35 U.S.C. 154(b) by 750 days.

(21) Appl. No.: 12/279,146

(22) PCT Filed: Feb. 27, 2007

(86) PCT No.: PCT/FR2007/000358
§ 371 (c)(1),
(2), (4) Date: Nov. 17, 2008

(87) PCT Pub. No.: WO2007/096539
PCT Pub. Date: Aug. 30, 2007

(65) Prior Publication Data
US 2009/0194639 A1    Aug. 6, 2009

(30) Foreign Application Priority Data
Feb. 27, 2006 (FR) .................................. 06 50678

(51) Int. Cl.
*B64G 1/00* (2006.01)
(52) U.S. Cl. ............... 244/158.6; 244/158.5; 244/158.8; 244/172.4

(58) Field of Classification Search .... 244/158.4–158.8, 244/17.4, 172.5, 171.7, 171.2, 171.3, 164, 244/172.4, 169
See application file for complete search history.

(56) References Cited

U.S. PATENT DOCUMENTS

| 4,898,349 | A | * | 2/1990 | Miller | 244/172.4 |
|---|---|---|---|---|---|
| 5,193,766 | A | | 3/1993 | Kawano et al. | |
| 5,845,880 | A | * | 12/1998 | Petrosov et al. | 244/169 |
| 5,868,358 | A | * | 2/1999 | Nakamura | 244/169 |
| 2003/0029969 | A1 | * | 2/2003 | Turner | 244/158 R |
| 2004/0026571 | A1 | | 2/2004 | Scott | |
| 2004/0031885 | A1 | * | 2/2004 | D'Ausilio et al. | 244/172 |

FOREIGN PATENT DOCUMENTS

EP    0 467 671 A2    1/1992

OTHER PUBLICATIONS

Ploen, S.R. et al., Dynamics of Earth Orbiting Formations, Jet Propulsion Labaratory, California Institute of Technology.*

(Continued)

*Primary Examiner* — Timothy D Collins
*Assistant Examiner* — Jamie S Stehle
(74) *Attorney, Agent, or Firm* — Oliff & Berridge, PLC

(57) ABSTRACT

A spacecraft (P) has a propulsion system making it possible to exert a force of variable magnitude and orientation on the spacecraft, a control system designed to control the propulsion system in terms of magnitude and orientation so as to make the spacecraft approach a target around a planet, with the aid of a force having at least one component ($f^x$, $f^y$, $f^z$), in the rotating reference frame tied to the target, which depends substantially linearly on the corresponding coordinate (x, y, z) of the craft in this reference frame.

18 Claims, 3 Drawing Sheets

OTHER PUBLICATIONS

Figure 1:
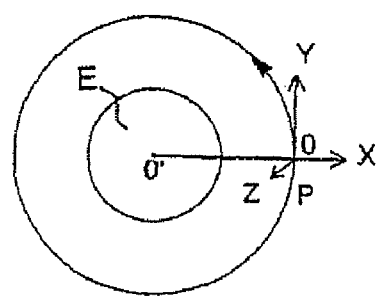

Meissinger et al., "Simplified Algorithm for Short Target-Approach Paths in Orbit", *Journal of Spacecraft and Rockets*, vol. 39, No. 5, Sep. 2002, pp. 815-818.

Lembeck et al., "Optimal Impulsive Intercept with Low-Thrust Rendezvous Return", *Journal of Guidance, Control, and Dynamics*, vol. 16, No. 3, May-Jun. 1993, pp. 426-433.

* cited by examiner

SPACECRAFT AND METHOD FOR OPERATING THE SPACECRAFT

FIELD OF THE DISCLOSURE

The present invention relates to a spacecraft, a system for guiding the spacecraft and a method for operating the spacecraft.

The spacecraft is for example a satellite, a probe, a space shuttle or a replenishment module.

In order to ensure the provisioning of the International Space Station (ISS), the assembling of new structures thereof, the renewal of its crew or the setting up of new experiments, it is necessary for spacecraft to be docked with this station. The docking of a spaceship with the station, at a mean altitude of 370 km, is a relatively complex operation, which, for the final approach phase, typically for the last few kilometers, requires changes of orbit. These changes of orbit must take account of the respective motions of the spacecraft and of the station in the terrestrial gravitational field.

Additionally, placing an interplanetary probe into orbit around a planet or maintaining a swarm of satellites in formation also involves a phase of approach to an orbital position.

Currently, the trajectory of a spacecraft, or hunter, in a phase of approach to an orbital position, or target, is determined by virtue of Hill's equations, sometimes also called the Clohessy-Wiltshire equations.

The spacecraft, after a so-called Hohmann transfer carried out from a low orbit, under the effect of a brief pulse $F.\Delta t$ (with in particular $\Delta t \leq 0.5$ seconds) generated with the aid of a jet of gas or compressed liquid, experiences a very small variation in its orbital speed $\Delta v$ (between $10^{-1}$ to $10^{-2}$ m/s). The motion of the spacecraft is determined by the geodesic deviation equations of which Hill's equations are a particular case.

In the final approach phase, typically the last few hundred meters, the hunter and the target may be at relative rest in one and the same orbit, termed the parking orbit. Two parking positions are possible, in front of or behind the target with respect to its orbital motion.

In the second case (hunter to the rear of the target), two possibilities arise for closing in on the target:

1) decrease the orbital speed of the hunter with the aid of a brief negative pulse, tangential to the orbit of the hunter, the latter then describing an epicyclic trajectory towards the target, 2) apply a centripetal pulse allowing the hunter to describe a half-ellipse forwards.

When the hunter is below or above the parking orbit, the relative position of the hunter and of the target is not static and Hill's radial equation shows that the hunter experiences a gravitational force exhibiting a gradient which is centrifugal when the hunter is above the parking orbit and centripetal when the hunter is below this orbit.

BACKGROUND

Application EP 0 467 671 A2 discloses a method for closing in on the trajectory of a rendez-vous by exerting successive pulses.

The article "Optimal Impulsive Intercept with low. Thrust Rendez Vous Return", Journal of guidance, Control and Dynamics, Vol. 16, No. 3, May-June 1993, discloses a method which makes it possible to modify the trajectory of a satellite so as to avoid a collision for example and to bring it back to its initial orbit after this deviation, by exerting a succession of high thrusts and low thrusts.

The article "Simplified Alg. for short Target. Approach Paths in Orbit", J. Spacecraft, Vol. 39, No. 5, relates to the final approach, performed by a spacecraft, to a target, when the craft is a distance of less than 100 m away. The approach to the target is performed by exerting pulses, then a retromaneuver takes place at the end of the approach.

Application US 2004/0026571 A1 discloses satellite navigation and guidance systems.

SUMMARY

The invention proposes in particular a novel way of controlling a spacecraft so as to make it approach a target, which is for example another spacecraft, in particular a satellite, a space station, a probe, or a locus of an orbit.

The invention thus relates, according to one of its aspects, to a spaceship comprising:

a propulsion system making it possible to exert a force of variable magnitude and orientation on the spacecraft, a control system designed to control the propulsion system in terms of magnitude and orientation so as to make the spacecraft approach a target around a planet.

The force exerted by the propulsion system depends, in magnitude and/or orientation, on the coordinates of the spacecraft in the rotating reference frame tied to the target.

This force may be of variable orientation and variable magnitude, the orientation and the magnitude being for example modified continuously.

The force may have at least one component $f_x$, $f_y$ or $f_z$ in the rotating reference frame tied to the target which vary, in particular, substantially linearly, with the corresponding coordinate x, y or z of the craft in this reference frame, in particular which is proportional to it.

The force may have at least two components $f_x$, $f_y$ or $f_z$ in the rotating reference frame tied to the target which vary substantially linearly with corresponding coordinates x, y or z of the craft in this reference frame, in particular two coordinates, and which are for example proportional to them. The third component may be zero, for example.

It may, in exemplary implementations of the invention, be a force:

directed substantially towards the target, the force having a magnitude substantially proportional to the distance between the spacecraft and the target, or substantially radial, namely substantially collinear with the radius joining the projection onto the plane of the orbit of the target of the center of the planet to the target, and directed towards the target, the force having a magnitude substantially proportional to the difference in altitude between the spacecraft and the target.

Such a force, directed substantially towards the target or substantially radial and directed towards the target, applied to the spacecraft, can make it possible to stabilize the motion of the spacecraft in the vicinity of the target and to reduce the duration of the approach phase.

This force, being exerted in the orbital plane of the target, may be regarded as a restoring force.

In other exemplary implementations of the invention, the components of the force are for example:

$$f^x = -3\Omega^2 x, f^y = 0, f^z = \Omega^2 z,$$

or $$f^x = -3\Omega^2 x + \epsilon.A, \ \epsilon = \pm 1, \text{A being a positive constant,}$$
$$f^y = 0, f^z = \Omega^2 z,$$

or $$f^x=\Omega^2 x, f^y=\epsilon.B, \epsilon=\pm 1, \text{B being a positive constant,}$$
$$f^z=\Omega^2 z.$$

The propulsion system comprises, if so desired, at least one electric propulsion unit, in particular a Hall-effect propulsion unit or, as a variant, a grid-based ion propulsion unit.

An electric propulsion unit generally exhibits a lower initial mass than that of a chemical propulsion unit of equivalent thrust, thereby making it possible to reduce the mass carried on board the spacecraft and therefore the launch costs.

An electric propulsion unit can also make it possible to control in an accurate manner the trajectory of the spacecraft and to reduce the duration of the approach phase, by virtue of low thrusts.

As a variant, the propulsion system comprises at least one chemical propulsion unit.

In an exemplary implementation of the invention, the propulsion system is designed to produce a thrust lying between about 10 mN and 5 N, for example greater than 50 mN or 100 mN.

The propulsion system can be designed in such a way that one at least of the magnitude and the orientation of the force can be modified continuously or, as a variant, in increments.

The magnitude and/or the orientation of the force can be controlled, if so desired, by the addition of an exterior magnetic field.

The propulsion system can comprise, if appropriate, an orientable support on which at least one propulsion unit is disposed.

This orientable support can be displaced so as to modify the orientation of the force applied to the spacecraft. The orientation can depend on the coordinates of the craft in the reference frame tied to the target.

In an exemplary implementation of the invention, the spacecraft comprises several propulsion units disposed at various locations of the spacecraft in such a way that, by selectively turning on the various propulsion units, the magnitude and the orientation of the resulting force exerted on the spacecraft are made to vary.

The control system can be designed to control the propulsion system in terms of magnitude and orientation in such a way that, in a first phase in which the spacecraft approaches the target, the spacecraft describes a substantially epicyclic trajectory in the rotating reference frame with center coinciding with the target.

The control system can be designed so that the force exerted on the spacecraft, during the first approach phase, is directed substantially towards the target, the force having a magnitude substantially proportional to the distance between the spacecraft and the target.

This force is a force collinear with the vector radius joining the spacecraft to the target and directed towards the target, its magnitude and its sense being in particular chosen so as to compensate for the radial centripetal force experienced by the spacecraft in the vicinity of the target. This force comprises a component that is centripetal tangentially to the orbit. This allows the spacecraft, in particular when it is below or above the target, to approach the latter.

As a variant, the control system can be designed so that the force exerted on the spacecraft, during the first approach phase, is substantially radial and directed towards the target, the force having a magnitude substantially proportional to the difference in altitude between the spacecraft and the target.

This radial force allows in particular the spacecraft which is to the rear or to the front of the target, to approach the latter.

During the first approach phase, the spacecraft can be brought to a few tens of meters from the target, for example to a distance of less than 100 m or 50 m.

Advantageously, the control system is designed to control the propulsion system in terms of magnitude and orientation in such a way that, in a second phase in which the spacecraft approaches the target, following the first phase, the spacecraft describes a trajectory substantially in the shape of a circular arc, in particular a semicircle, in the rotating reference frame with center coinciding with the target, the force exerted on the spacecraft being substantially radial and directed towards the target, the force having a magnitude substantially proportional to the difference in altitude between the spacecraft and the target.

This force enables the spacecraft to be made to approach the target to a distance of less than a few meters, for example less than 1 m.

The subject of the invention is also, according to another of its aspects, a guidance system for guiding a spacecraft so as to make it approach a target around a planet, the spacecraft comprising a propulsion system making it possible to exert a force of variable magnitude and orientation on the spacecraft and a control system designed to control the propulsion system, the guidance system comprising;

a remote data transmission system designed to transmit useful data to the control system of the spacecraft so as to allow it to control the propulsion system in terms of magnitude and orientation in such a way as to make the spacecraft approach the target, with the aid of a force which for example is:

directed substantially towards the target, the force having a magnitude substantially proportional to the distance between the spacecraft and the target, or substantially radial, namely substantially collinear with the radius joining the projection onto the plane of the orbit of the center of the planet to the target, and directed towards the target, the force having a magnitude substantially proportional to the difference in altitude between the spacecraft and the target, or defined by $f^x=-3\Omega^2 x$, $f^y=0$, $f^z=\Omega^2 z$, or defined by $f^x=-3\Omega^2 x+\epsilon.A$, $\epsilon=\pm 1$, A being a positive constant, $f^y=0$, $f^z=\Omega^2 z$, or defined by $f^x=-3.\Omega^2 x$, $f^y=\epsilon.B$, $\epsilon=\pm 1$, B being a positive constant, $f^z=\Omega^2 z$.

The data transmission system can be disposed at least partially:

on a planet, and/or on another spacecraft such as a space station, this other spacecraft being able in particular to define the target.

For example, the data transmission system can be designed to transmit, in particular in real time, to the control system of the spacecraft data relating to the distance between the spacecraft and the target. This distance is determined for example by virtue of a measurement system disposed on the surface of the planet around which the spacecraft is gravitating.

As a variant, the spacecraft comprises at least one measurement system designed to determine the distance separating it from the target.

The control system of the spacecraft can be designed to calculate the magnitude and/or the orientation of the force to be generated by the propulsion system in the approach phase, thereby allowing autonomous piloting of the spacecraft.

As a variant, the calculation of the magnitude and/or the orientation of the force to be generated is carried out with the aid of the guidance system, for example ground based or onboard another spacecraft.

The subject of the invention is also, according to one of its aspects, an assembly comprising the spacecraft and the guidance system.

The subject of the invention is also, according to another of its aspects, a method for operating a spacecraft so as to make it approach a target around a planet, comprising the step consisting in:

acting on a propulsion system of the spacecraft so as to exert a force which for example is:
  directed substantially towards the target, the force having a magnitude substantially proportional to the distance between the spacecraft and the target, or
  substantially radial, namely substantially collinear with the radius joining the center of the planet to the target, and directed towards the target, the force having a magnitude substantially proportional to the difference in altitude between the spacecraft and the target, or
  defined by $f^x=-3\Omega^2 x$, $f^y=0$, $f^z=\Omega^2 z$, or
  defined by $f^x=-3\Omega^2 x+\epsilon.A$, $\epsilon=\pm 1$, A being a positive constant, $f^y=0$, $f^z=\Omega^2 z$, or
  defined by $f^x=-3.\Omega^2 x$, $f^y=\epsilon.B$, $\epsilon=\pm 1$, B being a positive constant, $f^z=\Omega^2 z$.

Figure 2:
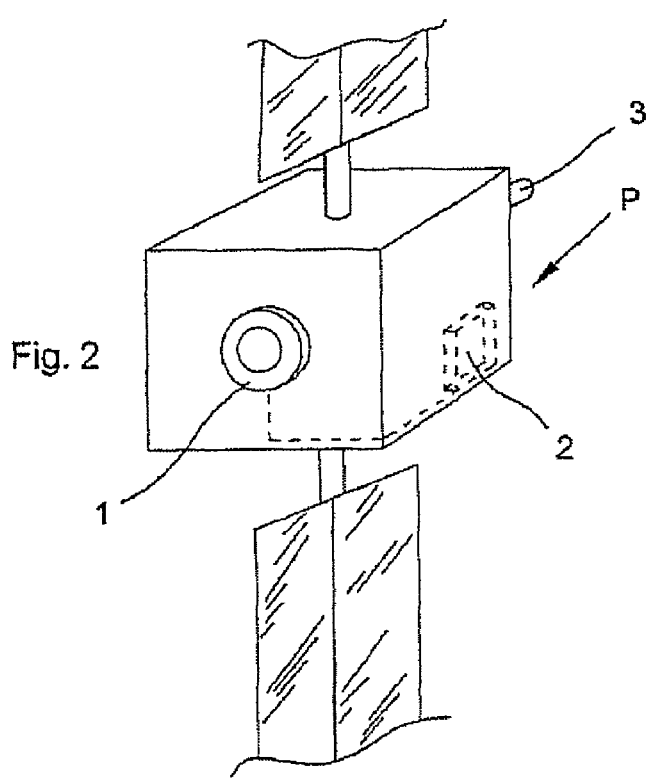
Figure 3:
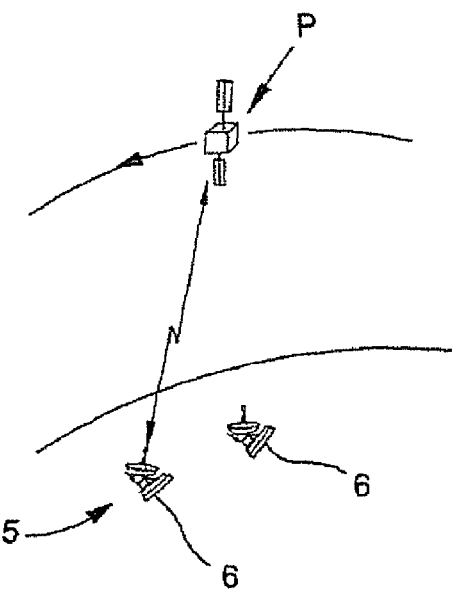
Figure 4:
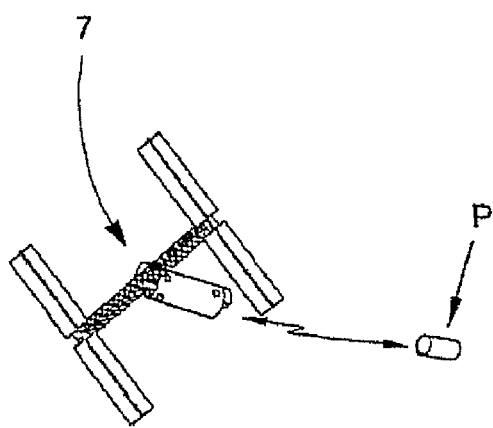

The present invention may be better understood on reading the detailed description which follows, of nonlimiting exemplary implementations of the invention, and on examining the appended drawing, in which:

FIG. 1 schematically represents a rotating reference frame with center coinciding with a target, FIG. 2 represents, schematically and partially, a spacecraft in accordance with the invention, FIGS. 3 and 4 represent, schematically and partially, two examples of a guidance system designed to guide a spacecraft, and FIGS. 5 to 8 schematically illustrate various exemplary trajectories of a spacecraft in accordance with the invention, in a target approach phase.

DETAILED DESCRIPTION OF EMBODIMENTS

Rotating Reference Frame (o, x, y, z)

Let us consider a target regarded as a point O, in circular orbit around the Earth E or another planet, as illustrated in FIG. 1. The target is for example demarcated by a space station in orbit around the Earth. The circular orbit is centered on a point O', corresponding substantially to the center of the planet. The radius of the orbit is equal to R, where R=R'+h, R' being the radius of the planet and h the altitude of the target.

Let us consider $\Omega$ defined by:
$\Omega^2.R^3=G.(M+m')\approx G.M$, where G is the gravitational constant, M the mass of the planet, m' the mass of the station, m' being negligible relative to M.

we shall describe below the phase of approach of a spacecraft P to the target O.

The spacecraft P, of mass m negligible compared with M, is referenced in the rotating reference frame of origin O with three axes: Ox outward oriented radial, Oy tangential to the orbit of the target in the direction of motion and Oz perpendicular to the plane (Oxy), Equations of Motion of the Spacecraft Let x, y and z be the coordinates of P in the rotating reference frame (O, x, y, z):

$\overrightarrow{OP}=x.\vec{i}+y.\vec{j}+z.\vec{k}$. Let us write $r=|\overrightarrow{OP}|$.

In the Galilean reference frame (O', $x_1$, $y_1$, $z_1$), it is assumed that the orbit of the target is situated in the plane (O', $x_1$, $y_1$).

We then put: $\overrightarrow{O'O}=X.\vec{i}_1+Y.\vec{j}_1$

We note that we have:

$$\vec{i} = \frac{1}{R} \cdot (X \cdot \vec{i}_1 + Y \cdot \vec{j}_1),$$

$$\vec{j} = \frac{1}{R} \cdot (-Y \cdot \vec{i}_1 + X \cdot \vec{j}_1),$$

$$\vec{k} = \vec{k}_1$$

We thus have:

$$\overrightarrow{O'P} = \left[X \cdot \left(1 + \frac{x}{R}\right) - y \cdot \frac{Y}{R}\right] \cdot \vec{i}_1 + \left[Y \cdot \left(1 + \frac{x}{R}\right) + y \cdot \frac{X}{R}\right] \cdot \vec{j}_1 + z \cdot \vec{k}_1$$

It is assumed that the spacecraft P is situated in the vicinity of the target O (for example a few kilometers away).

We then have $|\overrightarrow{OP}|/|\overrightarrow{O'O}| \ll 1$ (this ratio being, for example, of the order of $10^{-3}$), thereby making it possible to expand the right-hand side of the equations of motion.

By neglecting the second-order terms, Hill's equations are obtained after calculation:

$$\begin{cases} \ddot{x} - 2 \cdot \Omega \cdot \dot{y} = 3 \cdot \Omega^2 \cdot x \\ \ddot{y} + 2 \cdot \Omega \cdot \dot{x} = 0 \\ \ddot{z} + \Omega^2 \cdot z = 0 \end{cases} \qquad (I)$$

where $$\Omega = \sqrt{\frac{G \cdot M}{R^3}}.$$

We find that for x>0, the spacecraft experiences a centrifugal force and for x<0 a centripetal force, hence an instability of the motion of the spacecraft.

Reference may be made to the following articles for the derivation of Hill's equations:

El Mabsout B. "Mdthode semi-numerique de resolution du problème de Hill-Application à Phoebé" [Semi-numerical method for solving Hill's problem-Application to Phoebe], Astron. & Astrophys. 5 (1970) 68-83, Hill G. W. "Researches in the lunar theory", Am. J. Math. 1(1878) 5-26, Gurfil P., Kasdin N.J.: "Canonical modelling of coorbital motion in Hill's problem using epicyclic orbital elements", A & A 409 (2003)1135-1140.

In the system (I), the z equation is independent of the other two. Its general solution is a known periodic solution of angular frequency $\Omega$.

Approach Phase

In order to bring the spacecraft which is situated at an initial instant at the point ($x_0$, $y_0$), to the point ($x_1$, $y_1$) at a later instant $t_1$, the two relations are solved:

$x(t_1)=x_1$ and $y(t_1)=y_1$, with respect to the components of the initial speed.

It is found that it is possible to choose $\dot{x}_0$ or $\dot{y}_0$ arbitrarily and to determine the smallest possible value of $t_1$ as well as the second non-arbitrary component of the initial speed.

Additionally, if the initial speeds and the altitude $x_1$ are imposed at the instant $t_1$, $y_1$ will be imposed. In the plane of the orbit of the target, the final approach of the spacecraft P towards the target can be made along two directions: radial or orthoradial.

First Approach Phase: Vertical Closing

To perform vertical closing, a force exerted in the plane of the orbit of the target is applied to the spacecraft P in the form:

$$\vec{T} = -m.k.(x.\vec{i} + y.\vec{j}), k>0.$$

The above force $\vec{T}$ is directed substantially towards the target, with a magnitude proportional to the distance between the spacecraft and the target.

The stability of the solutions of the system (II) thus obtained:

$$\begin{cases} \ddot{x} - 2\cdot\Omega\cdot\dot{y} = (3\cdot\Omega^2 - k)x \\ \ddot{y} + 2\cdot\Omega\cdot\dot{x} = -k\cdot y \\ \ddot{z} + \Omega^2\cdot z = 0 \end{cases} \quad (II)$$

depends on the value of k.

For $3\Omega^2 - k \leq 0$, the system (II) possesses stable solutions, whereas for $k < 3.\Omega^2$ (comprising the case where k=0), there exists a positive eigenvalue giving rise to the instability of the solutions. Choosing $k=3.\Omega^2$ makes it possible to have a stable and simple solution of the equations below:

$$\begin{cases} \ddot{x} - 2\cdot\Omega\cdot\dot{y} = 0 \\ \ddot{y} + 2\cdot\Omega\cdot\dot{x} = -3\Omega^2\cdot y \\ \ddot{z} + \Omega^2\cdot z = 0 \end{cases} \quad (IIa)$$

and the solution of (IIb) in the plane of the orbit of the target is:

$$x(t) = \frac{2}{7\cdot\Omega}[1 - \cos(\sqrt{7}\cdot\Omega\cdot t)]\cdot\dot{y}_0 +$$

$$\frac{6}{7}\cdot\left[\frac{\sin(\sqrt{7}\cdot\Omega\cdot t)}{\sqrt{7}} - \Omega\cdot t\right]\cdot y_0 + \frac{1}{7}\cdot\left[\frac{4\cdot\sin(\sqrt{7}\cdot\Omega\cdot t)}{\sqrt{7}\cdot\Omega} + 3\cdot t\right]\cdot\dot{x}_0 + x_0$$

$$y(t) = \frac{1}{\sqrt{7}\cdot\Omega}\cdot\sin(\sqrt{7}\cdot\Omega\cdot t)\cdot\dot{y}_0 + \frac{1}{7}\cdot[3\cdot\cos(\sqrt{7}\cdot\Omega\cdot t) + 4]\cdot y_0 +$$

$$\frac{2}{7\cdot\Omega}\cdot[\cos(\sqrt{7}\cdot\Omega\cdot t) - 1]\dot{x}_0$$

For $k=3.\Omega^2$, we have $k=3.8988 \cdot 10^{-6}$ s$^{-2}$, taking $\Omega=0.00114$ s$^{-1}$.

Thus the maximum thrust necessary for a distance of 500 m and a satellite of 1000 kg is about 2 N.

Example 1

An exemplary approach phase with vertical closing allowing the spacecraft below the station to approach the latter will be described hereinafter, using the solutions of the system of equations (IIa).

Let us take $x_0=-300$ m, $y_0=0$ m, $\dot{x}_0=0.20$ m/s, and $x_1=0$. It is found that $y_1=20.4037$, the time necessary to reach the point $(x_1, y_1)$ is 3856 s.

Figure 5:
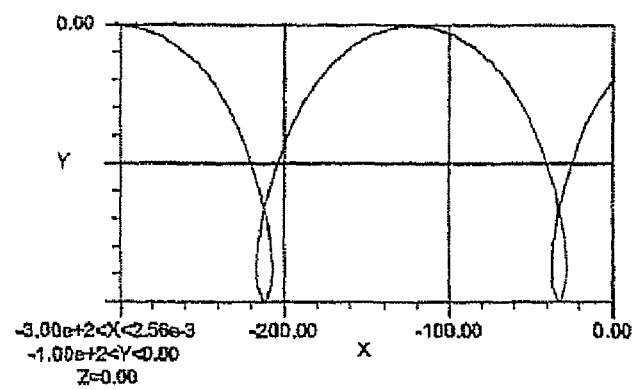

The epicyclic trajectory of the spacecraft in the approach phase is illustrated in FIG. 5.

The approach is made radially.

First Approach Phase, Closing in on the Orbit of the Target.

A radial force is applied to the spacecraft in the form:

$$\vec{T} = -6m\Omega^2.x.\vec{i}.$$

The above radial force $\vec{T}$ exhibits a magnitude proportional to the difference in altitude between the spacecraft and the target.

The equations may then be written:

$$\begin{cases} \ddot{x} - 2\cdot\Omega\cdot\dot{y} = -3\cdot\Omega^2\cdot x \\ \ddot{y} + 2\cdot\Omega\cdot\dot{x} = 0 \\ \ddot{z} + \Omega^2\cdot z = 0 \end{cases} \quad (II.b)$$

and the solution of (II.b) in the plane of the orbit is:

$$x(t) =$$
$$\frac{1}{7}\cdot\left(3\cdot x_0 - 2\cdot\frac{\dot{y}_0}{\Omega}\right)\cdot\cos(\sqrt{7}\cdot\Omega\cdot t) + \frac{\dot{x}_0\sin(\sqrt{7}\cdot\Omega\cdot t)}{\sqrt{7}\cdot\Omega} + \frac{2}{7}\cdot\left(\frac{\dot{y}_0}{\Omega} + 2\cdot x_0\right)$$

$$y(t) = \frac{-2}{7\cdot\sqrt{7}}\cdot\left(3\cdot x_0 - 2\cdot\frac{\dot{y}_0}{\Omega}\right)\cdot\sin(\sqrt{7}\cdot\Omega\cdot t) +$$

$$\frac{2\cdot\dot{x}_0\cdot\cos(\sqrt{7}\cdot\Omega\cdot t)}{7\cdot\Omega} + \frac{3}{7}\cdot(\dot{y}_0 + 2\cdot\Omega\cdot x_0)\cdot t + y_0 - \frac{2\cdot\dot{x}_0}{7\cdot\Omega}$$

Example 2

An exemplary approach phase with closing in on the orbit of the target allowing the spacecraft behind the target to approach the latter will be described hereinafter, using the solutions of the system of equations (IIb).

We take $x_0=0$, $y_0=-380$ m, $\dot{y}_0=0$, $\dot{y}_0=0.20$ m/s, and $x_1=0$. It is found that the value of $y_1$ which gives the closest position to the station is $y_1=-22.88$ m and that the time necessary to reach the point $(x_1, y_1)$ is 4166.36 s.

Figure 6:
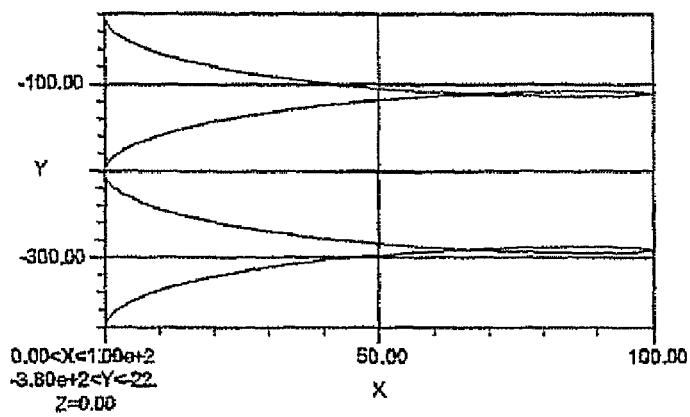

The epicyclic trajectory of the spacecraft in the approach phase is illustrated in FIG. 6.

The approach is made orthoradially.

Second Approach Phase

On completion of the first approach phase, the spacecraft arrives in proximity to the target. A second approach phase is implemented to reduce the distance between the spacecraft and the target so as to allow, if appropriate, docking maneuvers.

For this purpose, a radial force is applied to the spacecraft by choosing $k=3\Omega^2$ in the system of equations (II):

$$\begin{cases} \ddot{x} - 2\cdot\Omega\cdot\dot{y} = 0 \\ \ddot{y} + 2\cdot\Omega\cdot\dot{x} = 0 \\ \ddot{z} + \Omega^2\cdot z = 0 \end{cases} \quad (IV)$$

The solution in the plane of the orbit of the target may then be written:

$$x(t) = \frac{1}{2\cdot\Omega}\cdot[1 - \cos(2\cdot\Omega\cdot t)]\cdot\dot{y}_0 + \frac{1}{2\cdot\Omega}\cdot\sin(2\cdot\Omega\cdot t)\dot{x}_0 + x_0$$

$$y(t) = \frac{-1}{2\cdot\Omega}\cdot[1 - \cos(2\cdot\Omega\cdot t)]\dot{x}_0 + \frac{1}{2\cdot\Omega}\cdot\sin(2\cdot\Omega\cdot t)\dot{y}_0 + y_0,$$

defining a circle with equation:

$$\left[x - \left(x_0 + \frac{\dot{y}_0}{2\cdot\Omega}\right)\right]^2 + \left[y - \left(y_0 - \frac{\dot{x}_0}{2\cdot\Omega}\right)\right]^2 = \frac{\dot{x}_0^2 + \dot{y}_0^2}{4\cdot\Omega^2}$$

The center and the radius of this circle depend only on the initial speed. Its angular frequency is equal to $-2.\Omega$.

The maximum thrust necessary for a distance of 4 m and a satellite of 1000 kg is for example equal to about 15.6 mN.

Example 3

It is assumed that the final point of approach of the spacecraft is (0, −0.15). Hence the components of the initial speed must satisfy:

$$\frac{x_0 \cdot \dot{y}_0 + (0.15 + y_0)\dot{x}_0}{2 \cdot \Omega} + \dot{x}_0^2 + (0.15 + y_0)^2 = 0$$

Let us take: $x_0=0$, $y_0=-22.955$ m, $\dot{y}_0=0$, $\dot{x}_0=-0.026$, m/s.

Figure 7:
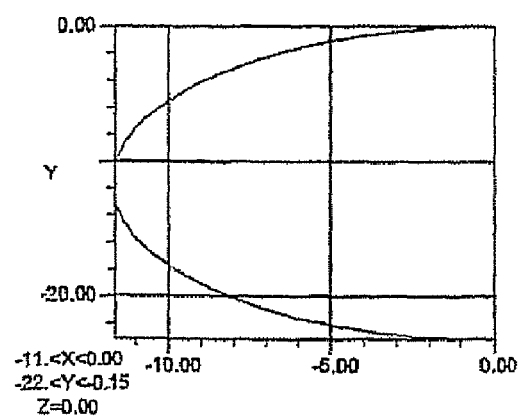

The trajectory of the spacecraft, for example over a quarter of an orbital period, in the second approach phase, is semi-circular, as illustrated in FIG. 7.

In another exemplary implementation of the invention, the motion in space is considered by taking account of the third equation in z.

We have the modified Hill equations:

$$\begin{cases} \ddot{x} - 2\Omega\dot{y} = 3\Omega^2 x = f^x \\ \ddot{y} + 2\Omega\dot{x} = f^y \\ \ddot{z} + \Omega^2 z = f^z \end{cases} \quad (1)$$

Let us take the force exerted on the craft, defined by:

$$\begin{cases} f^x = -3\Omega^2 x \\ f^y = 0 \\ f^z = \Omega^2 \cdot z \end{cases}$$

The system (1) then becomes:

$$\begin{cases} \ddot{x} - 2\Omega\dot{y} = 0 \\ \ddot{y} + 2\Omega\dot{x} = 0 \\ \ddot{z} = 0 \end{cases} \quad (2)$$

We note that the general solution of (2) is:

$$\left(x - \left[x_0 + \frac{\dot{y}_0}{2\Omega}\right]\right)^2 + \left(y - \left[y_0 - \frac{\dot{x}_0}{2\Omega}\right]\right)^2 = \frac{\dot{x}_0^2 + \dot{y}_0^2}{4\Omega^2},$$

$$z(t) = \dot{z}_0 t + z_0$$

This is a helix with axis parallel to the Oz axis and whose base in the (O, x, y) plane is a circle with centre $$\left(x_0 + \frac{\dot{y}_0}{2\Omega}, y_0 - \frac{\dot{x}_0}{2\Omega}\right).$$

This helix is upward or downward according to the sign of $\dot{z}_0$, in the frame of reference (O, xyz) of the target.

It is noted, moreover that there exists a constant particular solution obtained by taking the initial conditions:

$x_0=0$, $\dot{x}_0=0$, $\dot{y}_0=0$, $\dot{z}_0=0$; $y_0 \neq 0$ and $z_0 \neq 0$.

We than obtain a state of relative rest between the hunter and the target in the horizontal plane (O, y, z), this corresponding to flight in formation.

In another exemplary implementation of the invention, the force is defined by:

$f^x = -3\Omega^2 x + \epsilon \cdot A$, $\epsilon = \pm 1$, $f^y = 0$, $f^z = \Omega^2 z$ where A is a positive constant specific force, hence:

$$\begin{cases} \ddot{x} - 2\Omega\dot{y} = \epsilon \cdot A \\ \ddot{y} + 2\Omega\dot{x} = 0 \\ \ddot{z} = 0 \end{cases} \quad (3)$$

We obtain a trajectory with equations:

$$\left(x - \frac{[2\Omega\dot{y}_0 + 4\Omega^2 x_0 + \epsilon A]}{4\Omega^2}\right)^2 + \left(y + \frac{\epsilon A t}{2\Omega} - y_0 - \frac{\dot{x}_0}{2\Omega}\right)^2 =$$
$$\left(\frac{2\Omega\dot{y}_0 + \epsilon A]}{4\Omega^2}\right)^2 + \frac{\dot{x}_0^2}{4\Omega^2},$$

$$z(t) = \dot{z}_0 t + z_0$$

This is an epicycloid with axis Oy, on which the hunter moves in the y>0 or y<0 sense depending on the sign of $\epsilon$.

Figure 8:
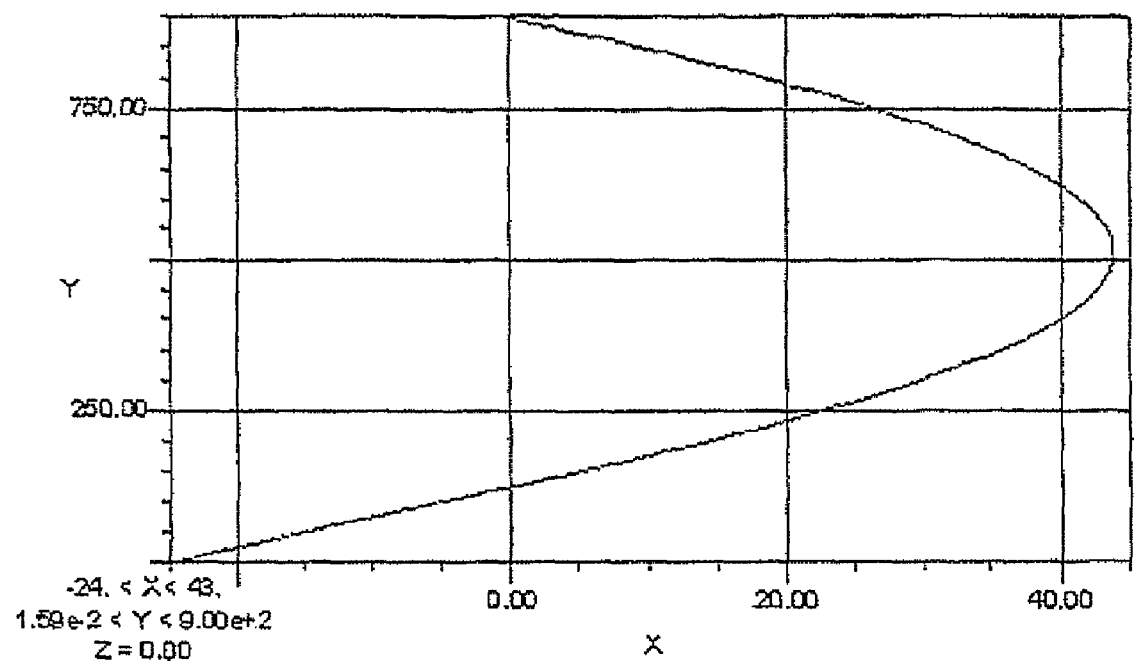

This case can be illustrated by the following example where we take:

$\Omega=0.00114$, $x_0=0$, $\dot{x}_0=-0.1$, $y_0=900$, $\dot{y}_0=-0.5$, $A=0.00114$, $\epsilon=1$. A trajectory as illustrated in FIG. 8 is obtained, where it is noted that the hunter is brought back from its initial position (x0=0, $y_0=900$ m) at the instant t=0, to the position: ($x_0=0.08$ m, y=123.78 m) at the instant t=1377 s, and to the position (x=−24.65 m, y=0.015 m) at the instant t=1639.7 s.

In another exemplary implementation of the invention, $f^x = -3\Omega^2 x$ and $f^y = \epsilon B$, $\epsilon = \pm 1$, $f^z = \Omega^2 z$ where B is a constant specific force, hence:

$$\begin{cases} \ddot{x} - 2\Omega\dot{y} = 0 \\ \ddot{y} + 2\Omega\dot{x} = \epsilon \cdot B \\ \ddot{z} = 0 \end{cases} \quad (4)$$

The equations of the trajectory are then analogous to those derived previously; they are obtained by replacing A by B, x by y, y by x and $\Omega$ by $-\Omega$:

$$\left(y - \frac{[-2\Omega\dot{x}_0 + 4\Omega^2 y_0 + \epsilon B]}{4\Omega^2}\right)^2 + \left(x - \frac{\epsilon B t}{2\Omega} - x_0 + \frac{\dot{y}_0}{2\Omega}\right)^2 =$$
$$\left(\frac{-2\Omega\dot{x}_0 + \epsilon B]}{4\Omega^2}\right)^2 + \frac{\dot{y}_0^2}{4\Omega^2},$$

$$z(t) = \dot{z}_0 t + z_0$$

This shows that the trajectory is an epicycloid on which the hunter moves in the positive x or negative x sense according to the sign of $\epsilon$.

This allows vertical closing, upward or downward, to the orbit of the target.

Spacecraft

Represented in FIG. 2 is an example of the spacecraft P formed by a satellite in orbit around the Earth.

The spacecraft P can, as a variant, be a module for replenishing a space station or an interplanetary probe.

The spacecraft P comprises a propulsion system 1 making it possible to exert a force of variable magnitude and orientation on the spacecraft P.

In the example considered, the propulsion system 1 comprises an electric propulsion unit, in particular a Hall-effect propulsion unit.

In this type of electric propulsion unit, charged particles are generated in a plasma source and are thereafter accelerated by an electric, magnetic or electromagnetic field, thereby making it possible to produce a thrust on the spacecraft.

In a Hall-effect propulsion unit, the acceleration of the particles is due to an electrostatic field.

Among Hall-effect propulsion units, mention may be made for example of the SPT100, PPS1350, PP55000 propulsion units manufactured by the company SNECMA, or the T-40, T-140, T200 and T220 T propulsion units manufactured by the company PRATT & WHITNEY.

As a variant, the electric propulsion unit can be a grid-based propulsion unit, for example the T5 or T6 propulsion unit developed by the company QINETIQ.

The electric propulsion unit 1 can for example produce a thrust of maximum magnitude of about 2 N.

As a variant, the propulsion system can comprise at least one chemical propulsion unit, provided for example with a turbopump, or a pressurized fluid propulsion unit equipped with a centrifugal turbopump of Couette-Taylor type, both designed to produce a variable thrust.

In the example considered, the propulsion system 1 is designed in such a way that one at least of the magnitude and of the orientation of the force can be modified continuously.

As a variant, the propulsion system 1 can be designed in such a way that one at least of the magnitude and the orientation of the force can be modified in increments.

The spacecraft P furthermore comprises a control system 2 designed to control the propulsion system 1 in terms of magnitude and orientation so as to make the spacecraft P approach the target O with the aid of a force such as defined above.

The control system 2 can comprise an onboard computer and be designed so as to allow autonomous piloting of the spacecraft in the approach phase, enabling it in particular to calculate the magnitude and/or the orientation of the force to be provided in this approach phase.

The spacecraft P can comprise for example a measurement system 3 making it possible to determine the distance separating it from the target O.

As a variant, a guidance system 5 can be provided to guide the spacecraft P so as to make it approach the target O, this guidance system being able to comprise one or more remote data transmission systems 6 designed to transmit useful data to the control system 2 of the spacecraft P so as to make it possible to control the propulsion system 1 in order to make the spacecraft P describe the target O approach trajectories.

When the spacecraft P is a module for replenishing a space station 7, as illustrated in FIG. 4, the guidance system can be at least partially carried on board the space station 7.

In the examples illustrated in FIGS. 3 and 4, the control system 2 of the spacecraft P can be of relatively simple design since the spacecraft P trajectory calculations can be carried out on computers based on the ground or onboard another spacecraft and the data relating to the calculated trajectories are transmitted to the control system 2 of the spacecraft.

In the examples described above, the orbit is circular.

One would not depart from the scope of the present invention were the orbit to be elliptical.

The expression "comprising a" should be understood as being synonymous with "comprising at least one", unless specified to the contrary.

The invention claimed is:

1. A spacecraft comprising:
   a propulsion system making it possible to exert a force of variable magnitude and orientation on the spacecraft, and
   a control system designed to control the propulsion system in terms of magnitude and orientation so as to make the spacecraft approach a target around a planet, with the aid of a force which comprises at least two components ($f^x$, $f^y$, $f^z$), in the rotating reference frame tied to the target, which depend substantially linearly on the corresponding coordinate of the craft in this reference frame,
   the force being defined by:

$$f^x = -3.\Omega^2 x, \; f^y = 0, \; f^z = \Omega^2 z;$$

$$f^x = -3\Omega^2 x + \epsilon.A, \text{ with } \epsilon \pm 1, \text{A being a positive constant,}$$
$$f^y = 0, \; f^z = \Omega^2 z;$$

or $$f^x = -3.\Omega^2 x, \; f^y = \epsilon.B, \; \epsilon = \pm 1, \text{ B being a positive constant,}$$
$$f^z = \Omega^2 z.$$

2. The craft according to claim 1, the force being directed substantially towards the target, the force having a magnitude substantially proportional to the distance between the spacecraft and the target.

3. The craft according to claim 2, the control system being designed so that the force exerted on the spacecraft, during the first approach phase, is directed substantially towards the target, the force having a magnitude substantially proportional to the distance between the spacecraft and the target.

4. The craft according to claim 1, the force being substantially collinear with the radius joining a projection of the center of the planet onto the plane of the orbit of the target to the target and directed towards the target, the force having a magnitude substantially proportional to the difference in altitude between the spacecraft and the target.

5. The craft according to claim 4, the control system being designed so that the force exerted on the spacecraft, during the first approach phase, is substantially collinear with the radius joining the center of the planet to the target and directed towards the target, the force having a magnitude substantially proportional to the difference in altitude between the spacecraft and the target.

6. The craft according to claim 4, the control system being designed to control the propulsion system in terms of magnitude and orientation in such a way that, in a second phase in which the spacecraft approaches the target, following the first phase, the spacecraft describes a trajectory substantially in the shape of a circular arc, in the rotating reference frame with center coinciding with the target, the force exerted on the spacecraft being substantially radial and directed towards the target, the force having a magnitude substantially proportional to the difference in altitude between the spacecraft and the target.

7. The craft according to claim 1, the propulsion system comprising at least one electric propulsion unit.

8. The craft according to claim 7, the electric propulsion unit being a Hall-effect propulsion unit.

9. The craft according to claim 7, the propulsion system being arranged in such a way that at least one of the magnitude and of the orientation of the force can be modified continuously.

10. The craft according to claim 9, the propulsion system being arranged in such a way that the magnitude can be modified continuously.

11. The craft according to claim 9, the propulsion system being arranged in such a way that the orientation can be modified continuously.

12. The craft according to claim 1, the control system being designed to control the propulsion system in terms of magnitude and orientation in such a way that, in a first phase in which the spacecraft approaches the target, the craft describes a substantially epicyclic trajectory in the rotating reference frame with center coinciding with the target.

13. The craft according to claim 1, the force being:
   directed substantially towards the target, the force having a magnitude substantially proportional to the distance between the spacecraft and the target, or
   substantially collinear with the radius joining a projection of the center of the planet onto the plane of the orbit to the target and directed towards the target, the force having a magnitude substantially proportional to the difference in altitude between the spacecraft and the target.

14. A method for operating the craft of claim 1, so as to make the spacecraft approach the target around the planet, comprising the step consisting in:
   acting on the propulsion system of the spacecraft so as to exert the force which comprises the at least two components ($f^x$, $f^y$, $f^z$) in the rotating reference frame tied to the target which depend substantially linearly on the corresponding coordinate (x, y, z) of the craft in this reference frame.

15. A guidance system for guiding a spacecraft so as to make the spacecraft approach a target around a planet, the spacecraft comprising a propulsion system making it possible to exert a force of variable magnitude and orientation on the spacecraft, and a control system designed to control the propulsion system, the guidance system comprising:
   at least one remote data transmission system designed to transmit useful data to the control system of the spacecraft so as to allow the control system to control the propulsion system in terms of magnitude and orientation in such a way as to make the spacecraft approach the target, with the aid of a force which comprises at least two components ($f^x$, $f^y$, $f^z$), in the rotating reference frame tied to the target, which depend substantially linearly on the corresponding coordinate of the craft in this reference frame, the force being defined by:

$$f^x = -3.\Omega^2 x, f^y = 0, f^z = \Omega^2 z;$$

$$f^x = -3\Omega^2 x + \epsilon.A, \text{ with } \epsilon = \pm 1, \text{ A being a positive constant}, f^y = 0, f^z = \Omega^2 z;$$

or $$f^x = -3.\Omega^2 x, f^y = \epsilon.B, \epsilon = \pm 1, \text{ B being a positive constant} \\ f^z = \Omega^2 z.$$

16. The guidance system according to claim 15, the force being:
   directed substantially towards the target, the force having a magnitude substantially proportional to the distance between the spacecraft and the target, or
   substantially collinear with the radius joining a projection of the center of the planet onto the plane of the orbit of the target to the target and directed towards the target, the force having a magnitude substantially proportional to the difference in altitude between the spacecraft and the target.

17. The guidance system according to claim 15, the data transmission system being disposed at least partially:
   on a planet, and
   on another spacecraft such as a space station, this other spacecraft being able to define the target.

18. The guidance system according to claim 15, the data transmission system being disposed at least partially:
   on a planet, or
   on another spacecraft such as a space station, this other spacecraft being able to define the target.

* * * * *